R. G. WHIPPLE.
AUTOMATIC TRAIN CONTROL.
APPLICATION FILED DEC. 29, 1914.

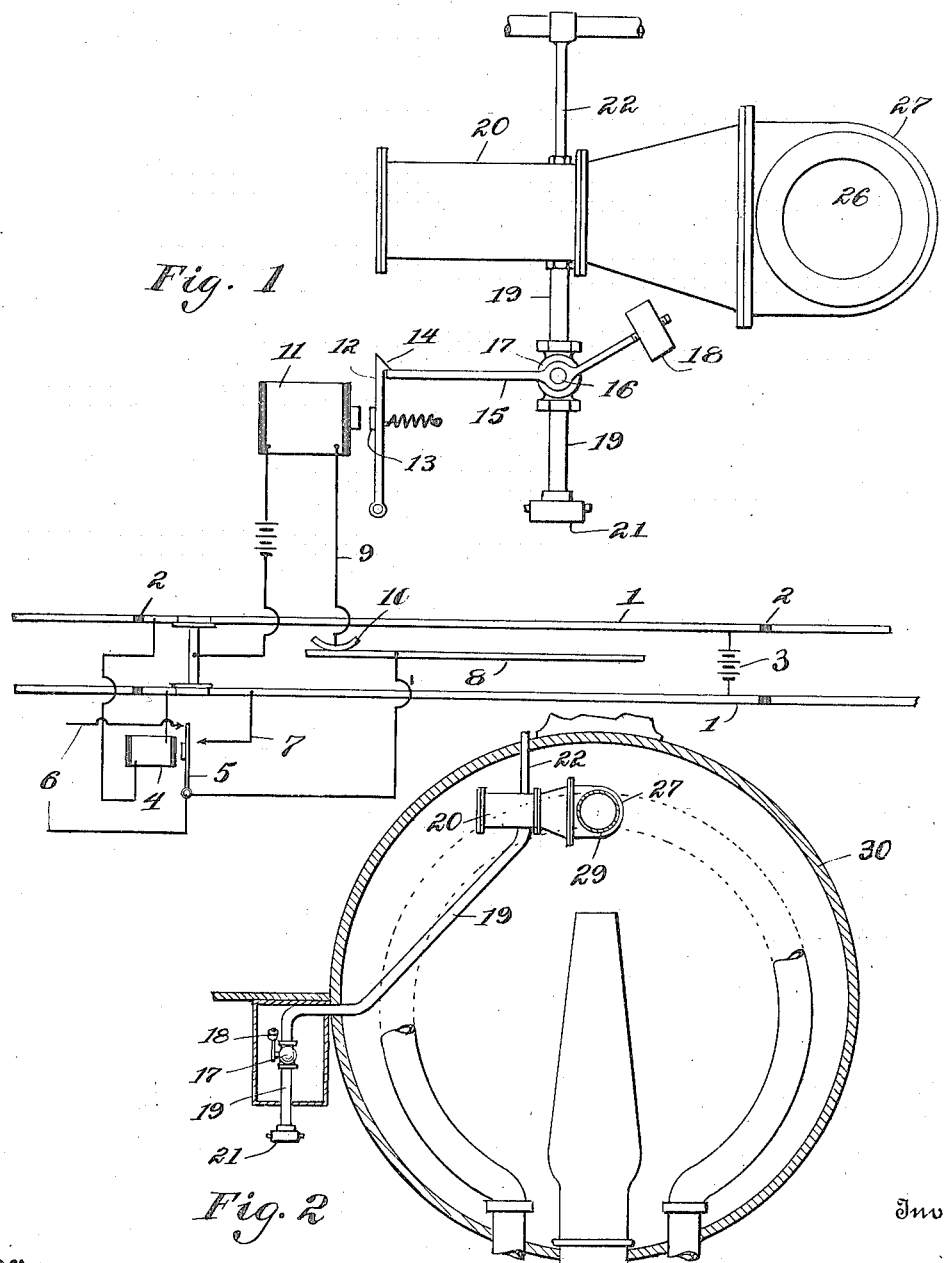

1,161,565.

Patented Nov. 23, 1915.
3 SHEETS—SHEET 2.

Witnesses
C. F. Rudolph
Wm. R. Smith

Inventor
R. G. Whipple,
By Victor J. Evans
Attorney

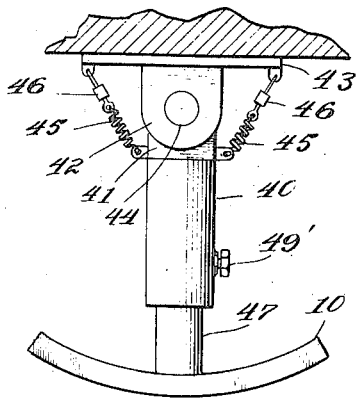
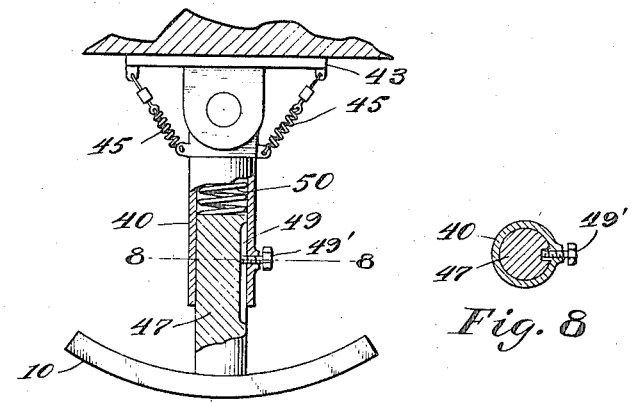
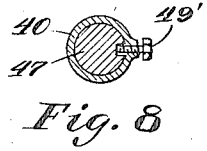
Fig. 6  Fig. 7  Fig. 8
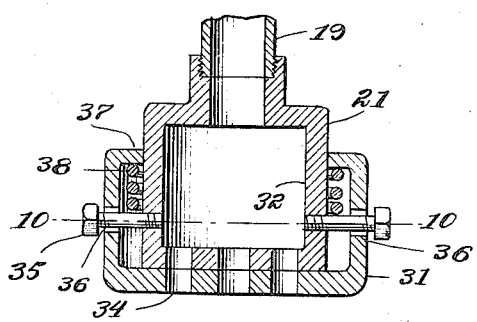
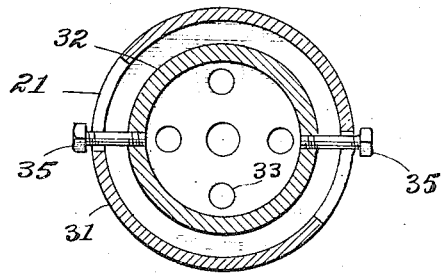
Fig. 9  Fig. 10
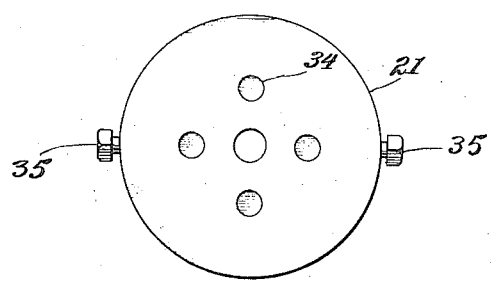
Fig. 11

UNITED STATES PATENT OFFICE.

RICHARD G. WHIPPLE, OF CHICAGO, ILLINOIS.

AUTOMATIC TRAIN CONTROL.

1,161,565.  Specification of Letters Patent.  Patented Nov. 23, 1915.

Application filed December 29, 1914. Serial No. 879,541.

*To all whom it may concern:*

Be it known that I, RICHARD G. WHIPPLE, a citizen of the United States, residing at Chicago, in the county of Cook and State of Illinois, have invented new and useful Improvements in Automatic Train Control, of which the following is a specification.

This invention relates to automatic train stops of that type wherein the steam supply is shut off prior to the application of the brake and has for its primary object the provision of a structure whereby the steam supply can be instantly cut off and the air brakes gradually applied so as to prevent excessive shocks.

An object of the invention is the provision of a structure wherein the valve controlling the steam supply is held in an inoperative position by the pressure of the air in the main air line so that upon a decrease in the air pressure the valve will move toward a cut off position.

Another object of the invention is the provision of a mechanism wherein the air motor for operating the valve has a valve controlled air outlet, the bore of which being of greater diameter than the bore of the air inlet with the result that when the air motor communicates with the atmosphere through said outlet the air within the air motor will escape more rapidly than the air enters, thus allowing the valve to move to a cut off position.

With the above and other objects in view, the invention consists in the construction, combination and arrangement of parts hereinafter set forth and falling within the scope of the claims.

Figure 3:
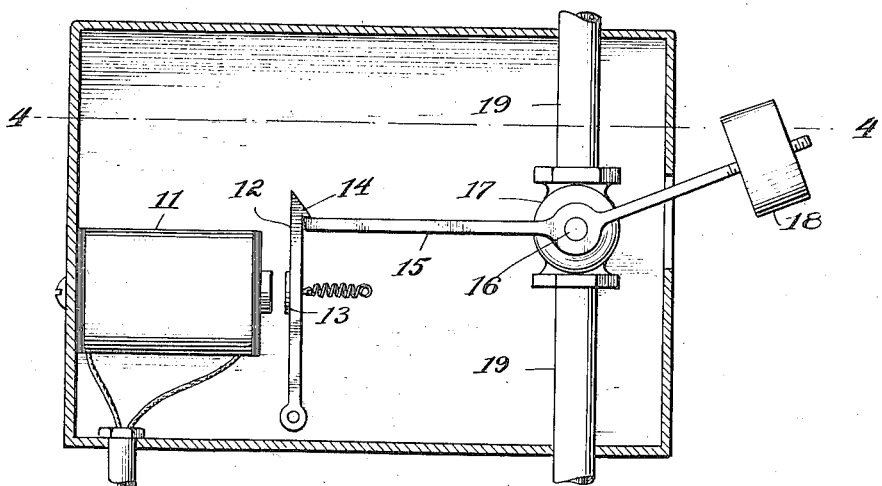
Figure 4:
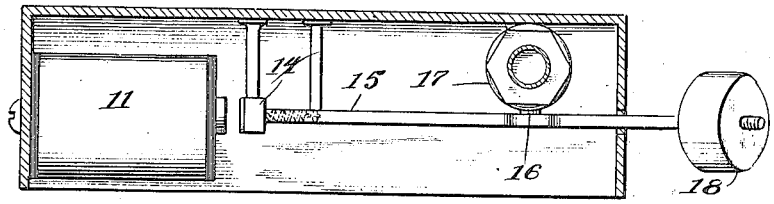
Figure 5:
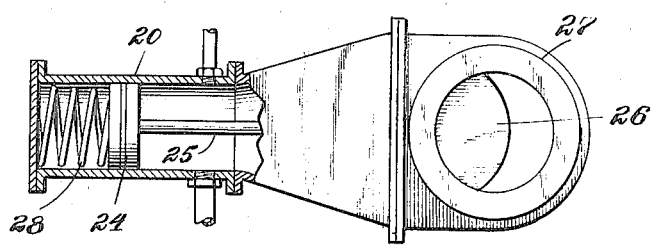

In the accompanying drawings: Figure 1 represents a diagrammatic view of the system. Fig. 2 is a longitudinal section through the smoke box of a locomotive showing the arrangement of the valves. Fig. 3 is a section through the casing showing the valve controlled means in side elevation. Fig. 4 is a section on the line 4—4 of Fig. 3. Fig. 5 is a section through the steam cut off valve. Fig. 6 is a side elevation of the contact tube. Fig. 7 is a vertical section therethrough. Fig. 8 is a detail section through Fig. 6. Fig. 9 is a vertical section through the regulating valve. Fig. 10 is a section on the line 10—10 thereof. Fig. 11 is a similar section showing the valve arranged to allow a minimum amount of air to escape to the atmosphere.

Referring to the drawings, the numeral 1 designates the main rails divided into blocks by insulation 2.

3 designates an ordinary form of track battery controlling the track relay 4 which in turn controls the armature 5, the movements of which control the closing of the semaphore circuit 6 of the track partial circuit 7 that has its terminals respectively connected to one of the main rails 1 and a short rail 8 positioned intermediate the main rails and adjacent the entrance to a block. Coöperating with the track partial circuit 7 is a train carried circuit 9 having one of its terminals connected to a contact shoe 10 and its remaining extremity grounded to a metallic part of the locomotive. Positioned in series with the train carried partial circuit is an electro-magnet 11 having control over a catch 12 through the medium of a soft iron armature 13. The bill 14 of the catch engages one extremity of an arm 15 secured intermediate its length to the stem 16 of a rotary valve 17 positioned in a pipe hereinafter described. The remaining extremity of the arm has secured thereto a weight 18 of a mass great enough to turn the valve to an open position immediately the opposite extremity is released from the bill 14 of the catch.

The numeral 19 designates the pipe in which the rotary valve 17 is positioned, and as shown communicates at one end with the interior of an air motor 20 and at its opposite end with a regulating valve 21. The air motor 20 is also connected to a pipe 22 the bore of which is of less diameter than the bore of the pipe 19. This pipe 22 is in communication with the main air line 23, thus the air in the air motor has a pressure equal to the pressure of the air in the main line. This air pressure within the air motor plays upon one side of a piston 24 connected to a stem 25 of a gate 26 of a valve 27. Positioned between the opposite face of the piston and one wall of the casing of the air motor is a coil expansion spring 28 which operates in opposition to the air pressure. This gate valve mechanism coöperates with the steam pipe 29 passing through the smoke box 30 of the locomotive.

For regulating the rapidity with which the brakes are applied, I provide a regulating valve 21 which as shown comprises an annular casing 31 inclosing the enlarged end 32 of the pipe 19. The enlarged end 32 is made solid with the exception of a series of circular openings 33 so arranged as to register, in one position of the casing, with the circular opening 34. The material of the casing between the opening 34 is of great enough area to completely close all of the openings except the central one when the casing is rotated to its final position in one direction. For limiting the rotary action of the casing 21, I provide bolts 35 which pass through the elongated slots 36 in the casing and are threaded into the enlarged end 32. Interposed between the shank of the bolt and the under surface of an inwardly extending flange 37 of the casing is a coil expansion spring 38 adapted to establish a perfectly tight fit between the surfaces in contact between the casing and the enlarged end 32. Secured to the under body of the locomotive is a contact shoe 10 adapted in the travel of the train to slide upon the upper surface of the short rail 8.

In constructing the shoe I take into consideration the tremendous impact that is created when the shoe of the fast traveling train comes into contact with the short rail. I allow for this impact by having the tube 40 provided at its upper end with a pair of spaced ears 41, adapted to be rotatably connected to the ears 42 of a bracket 43, through a bolt 44. This tube 40 is held in a vertical position through the action of a pair of coil expansion springs 45 that have their tensions regulated by turn buckles 46 connected respectively to the extremities of the spring and the body of the locomotive. Slidable within the tube 40 is a shank 47 projecting from an arcuate shaped shoe 10. The shank 47 is provided with a groove 49, the walls of which coöperate with a screw 49' threaded in the casing so as to limit the travel of the shank within the casing. For yieldably holding the shoe in contact with the short rail, I interpose between the upper end of the shank and the tube a coil expansion spring 50. Upon a train entering a danger zone, the electro-magnet 11 is energized through the contact shoe engaging the electrified short rail 8. The magnetic attraction of the magnet 11 disengages the bill 14 from one extremity of the arm so that the weight can gravitate and turn the valve to an operative position for allowing communication between the interior of the air motor and the atmosphere, the amount of communication being regulated by the regulating valve. Immediately the air motor is thrown into communication with the atmosphere, the air pressure within the air motor is decreased, with the result that the piston is moved forward through the expansive action of the coil spring. As the piston moves forwardly, the steam supply is cut off and it is to be noted that when the steam supply is cut off the piston is spaced a certain distance from one wall of the casing of the air motor so as to allow the main air pressure to escape to the atmosphere for applying the brakes.

Owing to the fact that the diameter of the pipe 19 is greater than the diameter of the pipe 22, the pressure in the air motor when the pipe 19 is in communication with the atmosphere is not great enough to operate against the action of the coil spring, but immediately the valve 17 is closed, the pressure within the air motor increases and moves the gate 26 of the valve 27 to a cut off position against the action of the coil spring.

What is claimed is:—

1. Train carried mechanism comprising in combination a main air line and steam pipe, a cut off valve positioned in said steam pipe, an air motor for operating said valve, a pipe having a bore of small diameter connecting said motor to said air line, a pipe having a bore of larger diameter establishing communication between the interior of the motor and the atmosphere, means in said last mentioned pipe for cutting off communication between the said air motor and the atmosphere, and means for increasing and decreasing the outlet of said last mentioned pipe.

2. Train carried mechanism comprising in combination a main air line and steam pipe, a cut off valve positioned in said steam pipe, an air motor for operating said valve, a pipe having a bore of small diameter connecting said motor to said air line, a pipe having a bore of larger diameter establishing communication between the interior of the motor and the atmosphere, means in said last mentioned pipe for cutting off communication between the said air motor and the atmosphere, and spring pressed rotary means for increasing and decreasing the outlet of the said last mentioned pipe.

In testimony whereof I affix my signature in presence of two witnesses.

RICHARD G. WHIPPLE.

Witnesses:
 ELIZABETH J. WHIPPLE,
 CHAS. P. CLEARY.